(12) United States Patent
Waterford et al.

(10) Patent No.: US 9,646,774 B2
(45) Date of Patent: May 9, 2017

(54) POWER WAFER

(71) Applicant: Waterford Energy Solutions Corp., Deerfield Beach, FL (US)

(72) Inventors: Steve Waterford, Boca Raton, FL (US); Thomas R. Zwaska, Deerfield Beach, FL (US)

(73) Assignee: Trion Energy Solutions Corp., Deerfield Beach, FL (US)

( * ) Notice: Subject to any disclaimer, the term of this patent is extended or adjusted under 35 U.S.C. 154(b) by 0 days.

(21) Appl. No.: 14/732,669

(22) Filed: Jun. 5, 2015

(65) Prior Publication Data

US 2015/0357124 A1  Dec. 10, 2015

Related U.S. Application Data

(63) Continuation-in-part of application No. 14/517,766, filed on Oct. 17, 2014.
(Continued)

(51) Int. Cl.
*H01M 2/24* (2006.01)
*H01G 11/78* (2013.01)
(Continued)

(52) U.S. Cl.
CPC ............. *H01G 11/78* (2013.01); *H01G 11/76* (2013.01); *H01M 2/24* (2013.01); *H01M 2/266* (2013.01);
(Continued)

(58) Field of Classification Search
CPC ................................................ H01M 10/0486
(Continued)

(56) References Cited

U.S. PATENT DOCUMENTS 3,915,751 A   10/1975  Hamada et al.
4,307,161 A   12/1981  Brown
(Continued)

FOREIGN PATENT DOCUMENTS

CA     2428331 A1    11/2004
CN   201877526 U     6/2011
(Continued)

OTHER PUBLICATIONS

Tinnemeyer, "Diamagnetic Measurements in Lead Acid Batteries to Estimate State of Charge", 44th Power Sources Conference (2010), pp. 508-511.
(Continued)

*Primary Examiner* — Maria J Laios
(74) *Attorney, Agent, or Firm* — Corridor Law Group, P.C.

(57) ABSTRACT

A power wafer includes an enclosure that houses an energy plate such as a battery, capacitor, super-capacitor or other type of electrical energy storage device. A power wafer uses conductive infusions to make internal electrical connections. In some embodiments, the power wafer has an enclosure formed of a top structure and a bottom structure, which are configured to snap together. The bottom structure has an energy plate void and conductive infusion voids. In some embodiments, the infusions have carbon nanotubes that are magnetically aligned to increase the electrical and thermal conductivity of the infusions. In certain embodiments, the enclosure is configured to hold multiple energy plates in parallel and/or in series to increase the amperage and/or voltage of the power wafer. When the plates are stacked in parallel, an insulating barrier is placed between the plates.

20 Claims, 14 Drawing Sheets

Related U.S. Application Data

(60) Provisional application No. 62/008,223, filed on Jun. 5, 2014, provisional application No. 62/017,212, filed on Jun. 25, 2014.

(51) Int. Cl.

| | | |
|---|---|---|
| *H01M 2/26* | (2006.01) | |
| *H01M 2/30* | (2006.01) | |
| *H01M 2/36* | (2006.01) | |
| *H01M 4/66* | (2006.01) | |
| *H01M 10/04* | (2006.01) | |
| *H01G 11/76* | (2013.01) | |
| *H01M 4/75* | (2006.01) | |

(52) U.S. Cl.
CPC ............... *H01M 2/30* (2013.01); *H01M 2/36* (2013.01); *H01M 4/66* (2013.01); *H01M 10/049* (2013.01); *H01M 10/0413* (2013.01); *H01M 10/0436* (2013.01); *H01M 10/0463* (2013.01); *H01M 10/0486* (2013.01); *H01M 4/663* (2013.01); *H01M 4/75* (2013.01); *H01M 2220/20* (2013.01); *H01M 2220/30* (2013.01); *Y02E 60/13* (2013.01); *Y10T 29/42* (2015.01); *Y10T 29/49117* (2015.01)

(58) Field of Classification Search
USPC .......................................................... 429/179
See application file for complete search history.

(56) References Cited

U.S. PATENT DOCUMENTS

| | | |
|---|---|---|
| 5,147,737 A | 9/1992 | Post et al. |
| 5,425,858 A | 6/1995 | Farmer |
| 5,536,595 A | 7/1996 | Inkmann et al. |
| 5,552,242 A | 9/1996 | Ovshinsky et al. |
| 5,590,058 A | 12/1996 | Foreman |
| 5,626,989 A | 5/1997 | Doundoulakis |
| 6,444,352 B1 | 9/2002 | Herrmann et al. |
| 6,469,512 B2 | 10/2002 | Singh et al. |
| 6,668,247 B2 | 12/2003 | Singh et al. |
| 6,689,510 B1 | 2/2004 | Gow et al. |
| 6,778,913 B2 | 8/2004 | Tinnemeyer |
| 7,164,272 B1 | 1/2007 | Bel et al. |
| 7,479,344 B1 | 1/2009 | McDermott |
| 7,547,487 B1 | 6/2009 | Smith et al. |
| 7,554,294 B2 | 6/2009 | Srinivasan et al. |
| 7,615,967 B2 | 11/2009 | Cho et al. |
| 7,682,728 B2 | 3/2010 | Harper |
| 7,768,235 B2 | 8/2010 | Tae et al. |
| 7,800,345 B2 | 9/2010 | Yun et al. |
| 7,851,080 B2 | 12/2010 | Weber et al. |
| 8,017,259 B2 | 9/2011 | Yang et al. |
| 8,357,464 B2 | 1/2013 | Sastry et al. |
| 8,765,282 B2 | 7/2014 | Herrmann |
| 8,822,067 B2 | 9/2014 | Johnson et al. |
| 2002/0055038 A1 | 5/2002 | Aihara et al. |
| 2005/0238953 A1 | 10/2005 | Urso et al. |
| 2008/0086247 A1 | 4/2008 | Gu et al. |
| 2009/0011330 A1* | 1/2009 | Onodera ................ H01G 9/016 429/179 |
| 2009/0140742 A1 | 6/2009 | Koch et al. |
| 2009/0251149 A1 | 10/2009 | Buckner et al. |
| 2010/0079145 A1 | 4/2010 | Meisner et al. |
| 2011/0074432 A1 | 3/2011 | Tinnemeyer |
| 2011/0123851 A1 | 5/2011 | Byun |
| 2011/0151284 A1 | 6/2011 | Baek et al. |
| 2011/0151303 A1 | 6/2011 | Cherng et al. |
| 2011/0248680 A1 | 10/2011 | Timmons et al. |
| 2012/0003505 A1 | 1/2012 | Kim et al. |
| 2012/0032513 A1 | 2/2012 | Tsu et al. |
| 2012/0056584 A1 | 3/2012 | Mariels |
| 2012/0094165 A1 | 4/2012 | Valencia et al. |
| 2012/0133521 A1 | 5/2012 | Rothkopf et al. |
| 2012/0177972 A1 | 7/2012 | Lai et al. |
| 2012/0183835 A1 | 7/2012 | Young et al. |
| 2012/0316814 A1 | 12/2012 | Rahaman et al. |
| 2013/0088204 A1 | 4/2013 | Khare et al. |
| 2013/0101881 A1 | 4/2013 | Syed et al. |
| 2013/0260194 A1 | 10/2013 | Meyer et al. |
| 2013/0288096 A1 | 10/2013 | Frutschy et al. |
| 2014/0037863 A1* | 2/2014 | Lim ......................... B05D 5/12 427/557 |
| 2014/0087237 A1 | 3/2014 | Dhar et al. |
| 2014/0113177 A1 | 4/2014 | Dhar et al. |
| 2014/0141287 A1 | 5/2014 | Bertucci et al. |

FOREIGN PATENT DOCUMENTS

| | | |
|---|---|---|
| CN | 102479971 A | 5/2012 |
| EP | 0546872 A1 | 6/1993 |
| EP | 0629017 A1 | 12/1994 |
| EP | 1304755 B1 | 12/2007 |
| EP | 0969542 B1 | 6/2010 |
| EP | 1397841 B1 | 11/2010 |
| EP | 2541668 A1 | 1/2013 |
| EP | 2262040 B1 | 8/2014 |
| GB | 1241972 A | 8/1971 |
| JP | H2005304173 A | 10/2005 |
| KR | 1020070112489 A | 11/2007 |
| RU | 2340983 C1 | 12/2008 |
| WO | 9510127 A1 | 4/1995 |
| WO | 0229917 A1 | 4/2002 |
| WO | 2004103469 A1 | 3/2005 |
| WO | 2005033798 A2 | 7/2006 |
| WO | 2009146547 A1 | 12/2009 |
| WO | 2012024330 A3 | 5/2012 |
| WO | 2012149477 A3 | 12/2012 |
| WO | 2012092467 A3 | 1/2013 |

OTHER PUBLICATIONS

Nordic Patent Institute Novelty Search Report dated Feb. 28, 2014.
Invitation to Pay Additional Fees dated Jan. 8, 2015 in connection with PCT/US2014/061276.
International Search Report and Written Opinion dated Mar. 12, 2015 in connection with PCT/US2014/061276.
International Search Report and Written Opinion dated Sep. 1, 2015 in connection with PCT/US2015/034587.

* cited by examiner

POWER WAFER

CROSS-REFERENCE TO RELATED APPLICATIONS

This application is related to and claims priority benefits from U.S. Provisional Application No. 62/008,223 having a filing date of Jun. 5, 2014, entitled "Battery Wafer". This application is also related to and claims priority benefits from U.S. Provisional Application No. 62/017,212 having a filing date of Jun. 25, 2014, entitled "Battery Wafer Configured to Use Multiple Battery Plates". This application is a continuation-in-part of U.S. Non-provisional application Ser. No. 14/517,766 having a filing date of Oct. 17, 2014, entitled "Battery Management System and Method". Each of the '223, '212, and '766 applications is hereby incorporated by reference in its entirety.

FIELD OF THE INVENTION

The present application relates to electrical energy storage devices and, in particular, to a power wafer. A power wafer includes an enclosure that houses an energy plate, which is a term used to describe a battery, capacitor, super-capacitor or other type of electrical energy storage device.

The power wafer construct eliminates or reduces the need for wire and soldered, crimped or spot-welded internal electrical connections and thus enables higher amperage currents in both charging and discharging the device. The present disclosure also relates to a manufacturing ease-of-assembly approach that accommodates conductive infusion processes, as well as processes to align carbon nanotubes or other conductive particles within the conductive infusion, allowing for a wire-free energy storage device. In some embodiments, the power wafer is configured to utilize multiple energy plates that are connected in series and/or in parallel. The development of non-lithium materials-based power wafers is envisioned, although lithium-ion and other chemistries can benefit from this approach as well, in addition to electrostatic energy plates such as capacitors.

BACKGROUND OF THE INVENTION

The use of batteries and energy storage devices has become prevalent in today's world. According to LUX Research the market for energy storage in mobile applications will go from $28 billion in 2013 to $41 billion in 2018, excluding starter batteries, fixed installation batteries and super capacitors. Batteries are used to power everyday devices including laptops, tablets, smartphones, military devices, and increasingly, hybrid and electric cars. Unfortunately while these devices have become significantly more powerful and as a result require an increasing amount of energy to run, there have been few corresponding advancements in battery technology.

The first electrochemical battery was invented in the 1800s by Alessandro Volta. While there have been improvements over the years, the basic concept has not changed. Such batteries work by converting stored chemical energy into electrical energy. At its most basic level, a battery includes four main parts: a negative electrode (anode), a positive electrode (cathode), an electrolyte that allows ions to move between the anode to and the cathode during discharge (and in reverse during recharge) and two terminals that allow current to flow out from the battery to power a device or load connected to the battery.

When the circuit between the two terminals is complete, the battery produces electricity through electrochemical reaction(s) involving the anode, the electrolyte, and the cathode.

In order to increase the voltage (the potential energy of the battery) individual battery cells can be connected in series. In traditional batteries this can be accomplished by connecting battery plates internally via single-point solder joints or conductive-element-filled epoxies to a plurality of wires. The use of these wires has limited the type of materials that can be utilized for the cathode and anode. Furthermore, since it has been shown that the electron transfer radiates on the anode and cathode plates from the point of attachment, the wires are attached at a single point, they can bottleneck, or at least impede, the electron transfer involved in recharging or discharging a battery.

A battery's capacity can be increased by connecting the individual cells in parallel. Again, in traditional batteries this has been accomplished by connecting battery plates internally via single-point solder joints or conductive-element-filled epoxies to a plurality of wires which limits the type of materials that can be utilized for the cathode and anode, and creates a bottleneck with respect to the electron transfer involved in recharging or discharging a battery.

While other materials have shown promise in replacing lithium materials in rechargeable batteries, current battery structures limit their applicability. Due to a limited ability to make an effective wired connection to each battery plate and, since such battery cells have traditionally been connected internally via single-point solder joints or conductive-element-filled epoxies to a plurality of wires, this has limited the use of some alternative materials as well as limiting the charge and discharge current.

A battery that does not require that its plates be connected internally via single-point solder joints or via conductive-element-filled epoxies to a plurality of wires, would allow for alternative battery chemistries and capacitance storage plates to be used which would result in a new generation of batteries and energy storage devices. Additionally, the incorporation of conductive infusions containing carbon nanotubes or other particles that can be magnetically brought into alignment increases the energy transmission capability significantly. Such new batteries/capacitors can be made from non-toxic components, which theoretically can undergo far more charge/discharge cycles, are capable of charging in minutes not hours, and do not experience overcharging or polarity switching upon full discharge (both of which can cause thermal runaway in lithium-based batteries). Such a new generation of battery/capacitor represents significant advancements on numerous fronts.

SUMMARY OF THE INVENTION

An improved power wafer comprises:
(a) a bottom enclosure section;
(b) a top enclosure section;
(c) a first energy plate interposed between the bottom enclosure section and the top enclosure section; and
(d) at least one conductive infusion.

In certain embodiments, the at least one conductive infusion comprises conductive particles. The conductive particles can be carbon nanoparticles. The carbon nanoparticles are preferably magnetically aligned. The carbon nanoparticles can be carbon nanotubes and/or graphene.

In certain embodiments, the first energy plate comprises an anode and a cathode, and the at least one conductive infusion comprises a first conductive infusion electrically connected to the anode and a second conductive infusion electrically connected to the cathode.

In certain embodiments of the power wafer, the bottom enclosure section comprises:
(i) a first energy plate void configured to receive the energy plate;
(ii) a pair of ridges configured to hold the first energy plate;
(iii) a first conductive infusion void;
(iv) a second conductive infusion void, wherein the first conductive infusion void and the second conductive infusion void are partially separated by a first dam;
(v) a third conductive infusion void; and
(vi) a fourth conductive infusion void, wherein the third conductive infusion void and the fourth conductive infusion void are partially separated by a second dam.

The first energy plate void is preferably configured to allow for expansion and contraction of the first energy plate.

The bottom enclosure section preferably further comprises:
(vii) a receptacle hole configured to connect with a barbed pin located on the top section;
(viii) an elevated platform on which the top section rests when the power wafer is assembled.

In certain embodiments, the first conductive infusion void is configured to receive a first initial conductive infusion and connect to a first edge of the first energy plate and the third conductive infusion void is configured receive a second initial conductive infusion and to connect to a second edge of the first energy plate. The first and second initial conductive infusions preferably comprise conductive particles. The conductive particles in the first and second initial conductive infusions are preferably substantially aligned in the direction of the first and third voids. The conductive particles can be carbon nanoparticles. The carbon nanoparticles can be carbon nanotubes and/or graphene.

In certain embodiments of the power wafer, the top enclosure section comprises:
(i) a pair of side elevated ridges configured to press down upon the energy plate;
(ii) a pair of sealing elevated ridges configured to seal the top and bottom of the energy plate void;
(iii) a positive terminal;
(iv) a negative terminal; and
(v) a pair of air venting holes.

The positive terminal and the negative terminal are preferably configured to receive a first secondary conductive infusion and a second secondary conductive infusion, the first and the second secondary conductive infusions each comprising conductive particles, such that the conductive particles of the first and the second secondary infusion are substantially aligned within the direction of the second and the fourth voids.

In certain embodiments, the power wafer further comprises:
(e) a second energy plate,
and the bottom enclosure section further comprises:
(vii) a central conductive infusion void.

In certain embodiments, the power wafer further comprises:
(f) a first insulating barrier disposed between the first energy plate and a second energy plate.

In certain embodiments, the power wafer further comprises:
(e) an electrical terminal sized according to the current-carrying capacity of the first energy plate.

In certain embodiments of the power wafer, the first energy plate is a battery.

In certain embodiments of the power wafer, the first energy plate is a capacitor.

In certain embodiments of the power wafer, the first energy plate is coated on both sides and three edges with a first electrode coating, wherein a fourth edge has a second electrode coating disposed on a fourth edge of the first energy plate, and wherein the first electrode coating and the second electrode coating are different materials.

A method of manufacturing a power wafer, the method comprising:
(a) introducing a first round of conductive infusions into a first void and a second void in a bottom section of a power wafer enclosure;
(b) placing an energy plate in the bottom section of the power wafer enclosure, such that the energy plate is in contact with the conductive infusions that were added introduced into the first void and the second void;
(c) aligning electrically conductive particles within the first round of conductive infusions by use of a magnetic field;
(d) placing a top section of the power wafer enclosure on top of the energy plate;
(e) introducing a second round of conductive infusions via at least one terminal; and
(f) aligning electrically conductive particles within the second round of conductive infusions by use of a magnetic field.

In certain embodiments of the manufacturing, the electrically conductive particles within the first round of conductive infusions and within the second round of conductive infusions are aligned in different directions.

Embodiments of the power wafers described herein overcome shortcomings and disadvantages of prior designs. In at least some embodiments, conductive infusions can be used as and to make electrical connections. A conductive infusion is an electrically conductive liquid or gel that is injected into the channels and/or voids and is then optionally solidified by curing, solvent evaporation, heating or quenching. Solidification is useful when the conductive infusion is magnetically aligned in order to preserve the alignment. The conductive infusions can contain, but are not limited to, materials such as graphite, graphene, nickel, silver, and carbon nanotubes suspended in a base material (for example, an epoxy).

The ability to use conductive infusions allows the power wafer to be completely or at least essentially wire-free. This is significant, as wires and the way they are connected can contribute to the less than ideal performance of current conventional batteries. For example, resistance of wire and soldered, crimped or spot-welded connections can limit the charging currents and, hence, increase charging time for batteries. Conductive infusions can mitigate this limitation and also lower internal battery resistance and, thus, increase long-term performance. Conductive infusions also allow use of materials and methods that are otherwise incompatible with wire and soldered, crimped or spot-welded electrical connections.

Power wafers can be manufactured with a snap-fit, two-part enclosure which compresses and seals an energy plate within a conductive infusion. Other suitable fastening methods can be employed, such as an assembly with threaded holes for screws to enter and connect the top and bottom wafer enclosure sections, or other connecting methodologies. In another example, a quick drying sealant or glue is used to hold the two-part enclosure together.

The terms "bottom" and "top" are used herein to conveniently refer to an orientation of the enclosure sections. Those terms are not meant to restrict the orientation to one in which the sections are necessarily vertically aligned.

In at least one embodiment, the power wafer enclosure includes electrically conductive contacts or terminals that provide for an external electrical connection to the positive and negative poles of the device. The conductive contacts or terminals can vary in size and design based on the current carrying capability of the energy plate. They connect to the energy plate by means of the conductive infusions.

In at least one embodiment, the energy plate is a solid state battery plate with a cathode coating that covers both sides (namely, the major planar surfaces) of the plate and three edges of the plate. The enclosure contains internal infusion voids which, when filled with a conductive infusion, make the assembly essentially wire-free.

A conductive infusion, which can be based on an epoxy and/or another base material which contains, for example, carbon nanoparticles and/or silver nanoparticles. Carbon nanoparticles can include carbon nanotubes, graphene and/or carbon black. Carbon nanotubes are employed herein as representative carbon nanoparticles.

The construct of the infusion voids and the nature of the conductive infusion means that the electrical connection made to the energy plate is across a wider physical area and not at a single point of contact as in a wire connection. Thus, the conductive infusion material itself and the resulting infusion void connection can have an increased electrical and thermal conductivity that can far exceed that of existing copper wires or straps and their single point-of-attachment or connection.

Using conductive infusions can also alleviate manufacturing problems associated with cold solder joints or incomplete spot-welded connections. The electrical connection along the full or partial edge of an energy plate furthermore enhances the charge distribution on the plate. The design of the power wafer facilitates the alignment of the carbon nanotubes while the infusion is in liquid form and then solidified.

Adding carbon nanotubes to a non-conductive base material, even with their random orientation, can make the infusion electrically conductive or, in the case of a conductive base material, the randomly oriented CNTs can create a composite with a higher electrical conductivity than the base material alone. If, in addition, the nanotubes are aligned, meaning all or at least most of the nanotubes are oriented in the same direction, the electrical conductivity is further increased in the direction of the alignment and becomes more anisotropic. Carbon nanotubes that are coated (or "decorated") with a magnetically-sensitive metal (or metal oxide) are responsive to a magnetic field. Applying and holding a magnetic field while the liquid infusion transitions to a solid permanently aligns the carbon nanotubes. Conductive infusions with aligned carbon nanotubes have been shown to provide greater electric current densities than those of metals such as copper. Alternatively, a power wafer could be built using conventional wire, wire like materials or other conductive materials, and applicable connection techniques.

In some embodiments, a power wafer comprises multiple energy plates or battery plates which are stacked within the enclosure of the power wafer and with the aid of insulating divider(s), in parallel connection(s) can be achieved in order to increase the amperage of the power wafer. In other embodiments, energy plates or battery plates are aligned side-by-side within an enclosure in a series configuration to increase the voltage while utilizing the same power wafer enclosure.

Using the power wafer structure described herein, new or non-conventional materials can be used to build an energy storage device, particularly, but not limited to, metal fluorides such as iron trifluoride doped within a hydrogel cathodic coating.

Using a metal fluoride such as iron trifluoride can result in the power wafer having up to a theoretical threefold increase in energy storage versus current lithium-based batteries.

Batteries and/or energy storage devices in general made from chemicals, such as metal fluorides, do not experience thermal runaway as can occur with lithium materials-based rechargeable batteries. Furthermore, batteries based on metal-fluoride chemistry should have longer battery life-cycles (potentially up to 10,000 charging cycles compared to approximately 1,000~1,200 charging cycles of current lithium batteries).

DETAILED DESCRIPTION OF ILLUSTRATIVE EMBODIMENT(S)

In the following detailed description, reference is made to the accompanying drawings that form a part hereof, and in which is shown by way of illustration specific examples that can be practiced. It is to be understood that other examples can be utilized and that logical, mechanical, electrical and other changes can be made without departing from the scope of the subject matter of this disclosure. The following detailed description is, therefore, provided to describe exemplary implementations and not to be taken as limiting on the scope of the subject matter described in this disclosure. Certain features from different aspects of the following description can be combined to form yet further aspects of the subject matter discussed below.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements.

Figure 1:
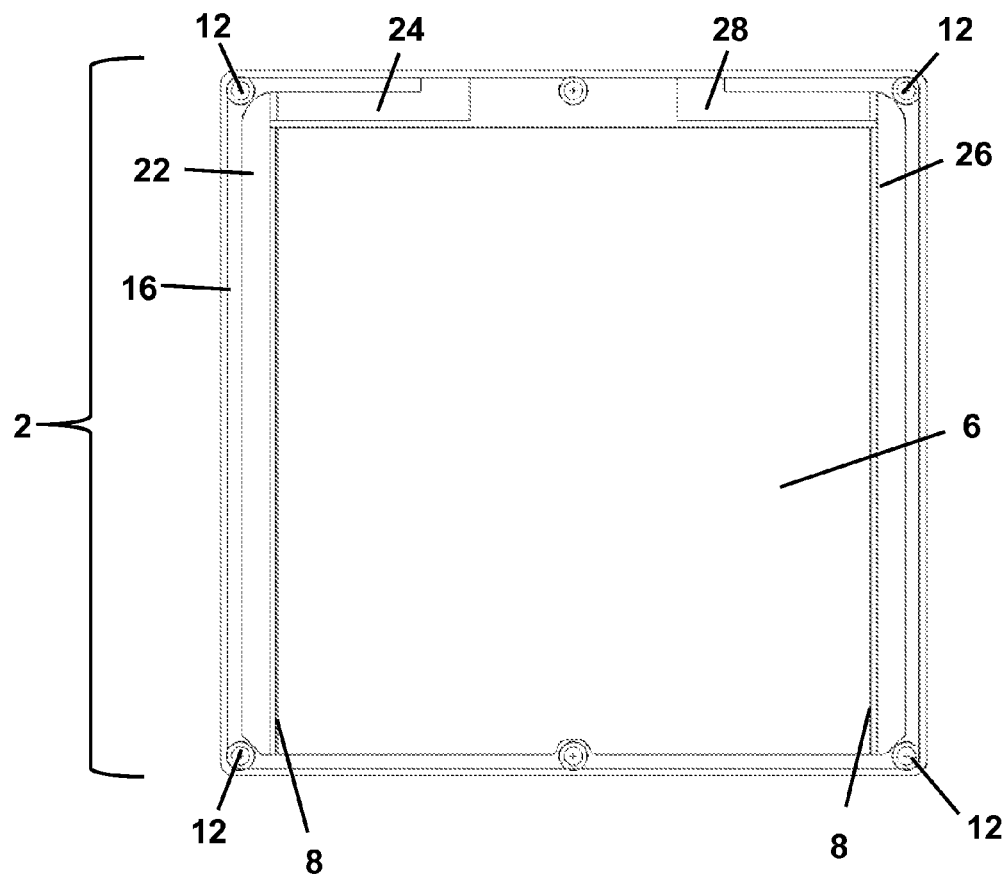
FIG. 1 is a top interior view of the bottom section of a power wafer enclosure.
Figure 3:
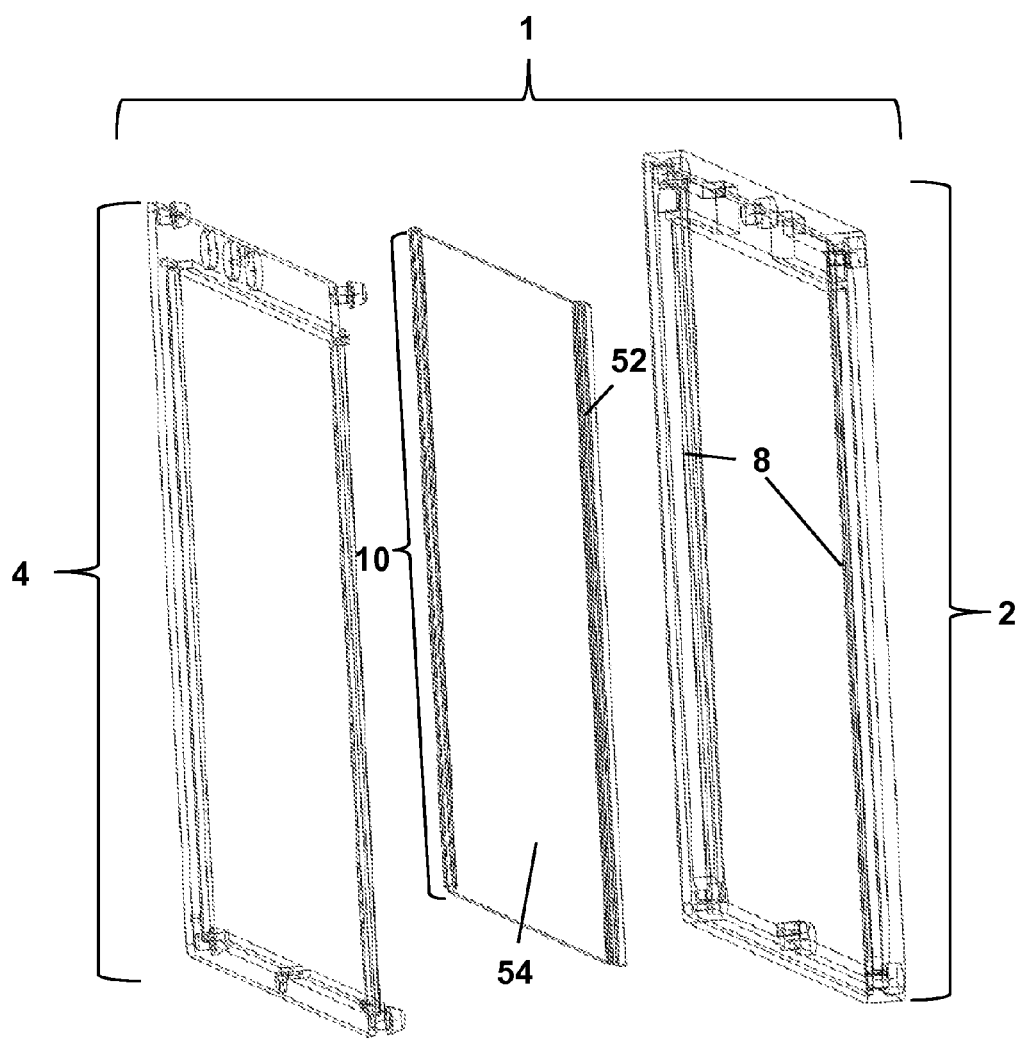
FIG. 3 is an exploded perspective view of a power wafer including the energy plate.

FIG. 1 illustrates a top view of bottom section 2 of power wafer 1 (shown in FIG. 3). Bottom section 2 includes energy plate void 6 where energy plate 10 (shown in FIG. 3) is inserted. Energy plate void 6 is configured to allow for the expansion/contraction of energy plate 10 due to charging/discharging and/or thermal expansion and contraction. In some embodiments, power wafer 1 is configured to hold multiple energy plates 10 in parallel (shown in FIG. 7 for example).

FIG. 1 also shows two ridges 8 of bottom section 2 on which energy plate 10 rests. Ridges 8 and raised and facilitate the separation between the positive/negative edges of energy plate 10 when the conductive infusions are added to form electrical connections with power wafer 1. In some embodiments, ridges 8 are tapered. Conductive infusions are added via voids 22, 24, 26, and 28. Void 22 connects to cathode coated edge 54 (shown in FIG. 3) of energy plate 10. Void 26 connects to uncoated anode edge 52 (shown in FIG. 3) of energy plate 10. In some embodiments, infusion voids 24 and 28 also provide for the placement of an electrical contact for external connection to the power terminals of energy plate 10. In some embodiments, these electrical contacts are gold-coated copper. The conductive infusion that fills an infusion void electrically connects elements that are fluidly connected to the void.

Bottom section 2 includes four receptacle corner holes 12 configured to connect with four barbed pins 32 (shown in FIG. 2) of top section 4 (shown in FIG. 2) to enable a snap-fit assembly. Bottom section 2 also includes elevated platform 16 on which top section 4 rests when power wafer 1 is assembled.

Figure 2:
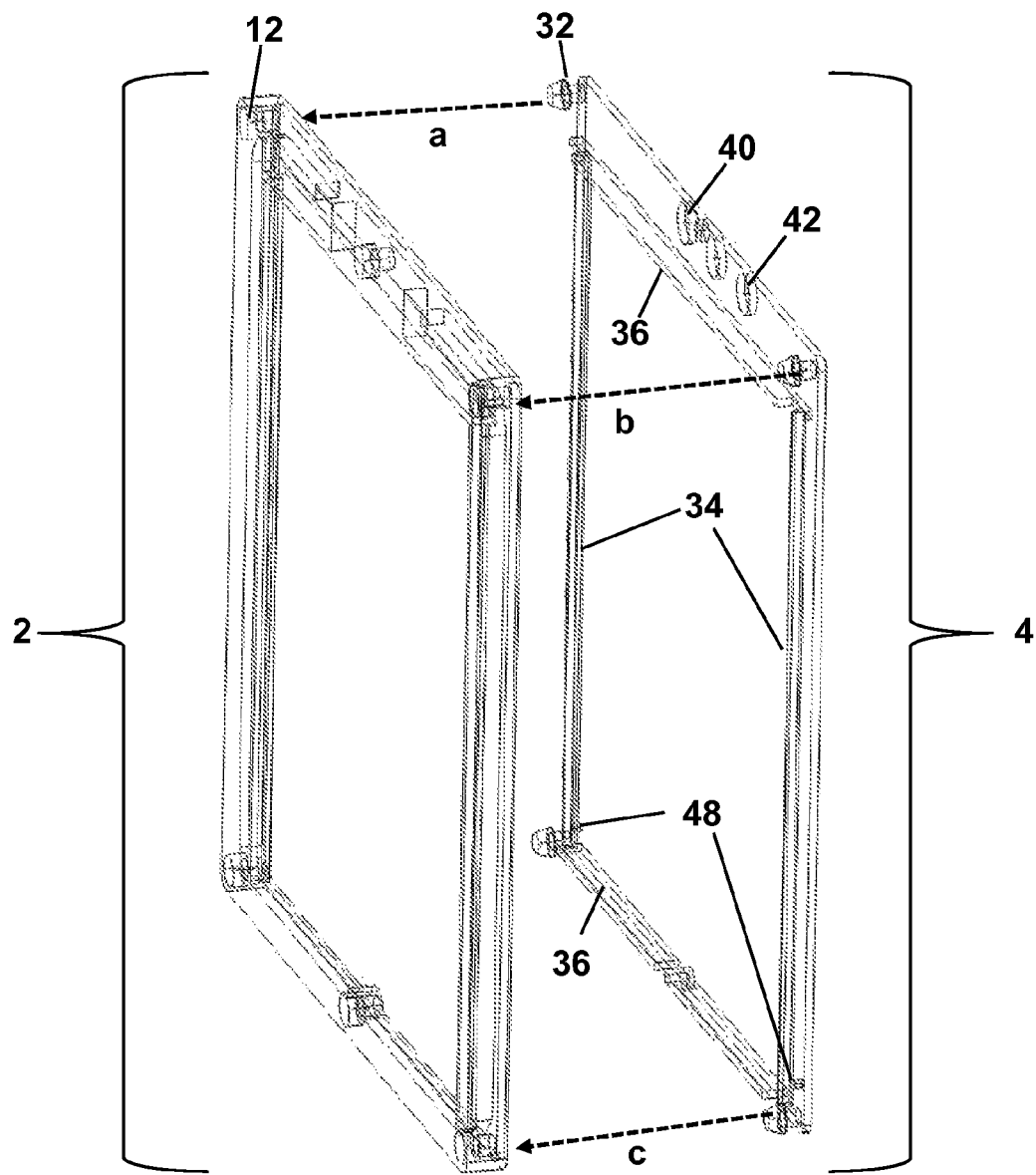
FIG. 2 is an exploded perspective view of a power wafer enclosure.

FIG. 2 is an exploded perspective view of top section 4 and bottom section 2 of the power wafer. FIG. 2 illustrates via dashed lines a, b and c how top section 4 connects with bottom section 2. Four-corner, male-barbed pins 32 fit into four receptacle corner holes 12 to create a snap-fit assembly. In other embodiments, the two sections of power wafer 1 can be connected using other fastening mechanisms.

FIG. 2 shows side elevated ridges 34 of top section 4 which are configured to press down upon the edges of energy plate 10 (shown in FIG. 3) to press or force it into the conductive infusions. FIG. 2 also shows sealing elevated ridges 36 which seal the top and bottom sections of energy plate void 6 (not visible).

FIG. 2 also illustrates final injection holes 40 and 42 in top section 4 that enable the final injection of a conductive infusion. Final injection hole 42 is for the positive pole, while final injection hole 40 is for the negative pole. Top section 4 also includes two air venting holes 48 which enable the free flow of the final conductive infusions. After each injection, if the infusions contain carbon nanotubes, power wafer 1 can be placed in a magnetic field so as to cause the nanotubes to align.

FIG. 3 is an exploded perspective view of power wafer 1, which shows top section 4, energy plate 10, and bottom section 2. In this embodiment, energy plate 10 is coated on both sides and three edges with cathodic coating 54. Energy plate 10 also has one uncoated anode edge 52. Energy plate 10 is configured to rest on the two ridges 8 of bottom section 2.

Figure 4:
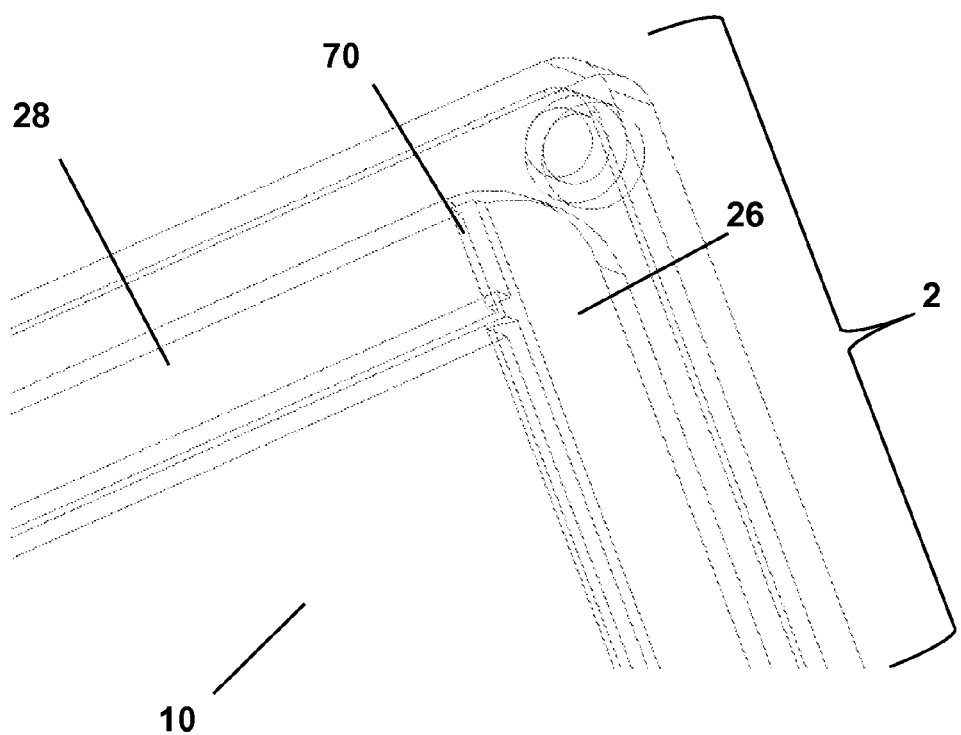
FIG. 4 is a close up perspective view of the bottom section of a power wafer enclosure with an energy plate inserted.

FIG. 4 is a close-up perspective view of bottom section 2 with energy plate 10 inserted. Infusion void 26 is blocked from void 28 by interior elevated ridge 70. Interior elevated ridge 70 dams restricts or blocks the flow of the initial conductive infusion from void 28 so that it only fills void 26. This enables the selective alignment of carbon nanotubes (or other anisotropic conductive particles) within void 26 through exposure to a magnetic field and then curing/solidifying (if the conductive infusion contains magnetically alignable particles such as carbon nanotubes or other conductive particles). This can increase electrical conductivity and direct electron flow parallel to the sides of power wafer 1. A similar set-up is used between infusion voids 22 and 24 (shown in FIG. 5)

Figure 5:
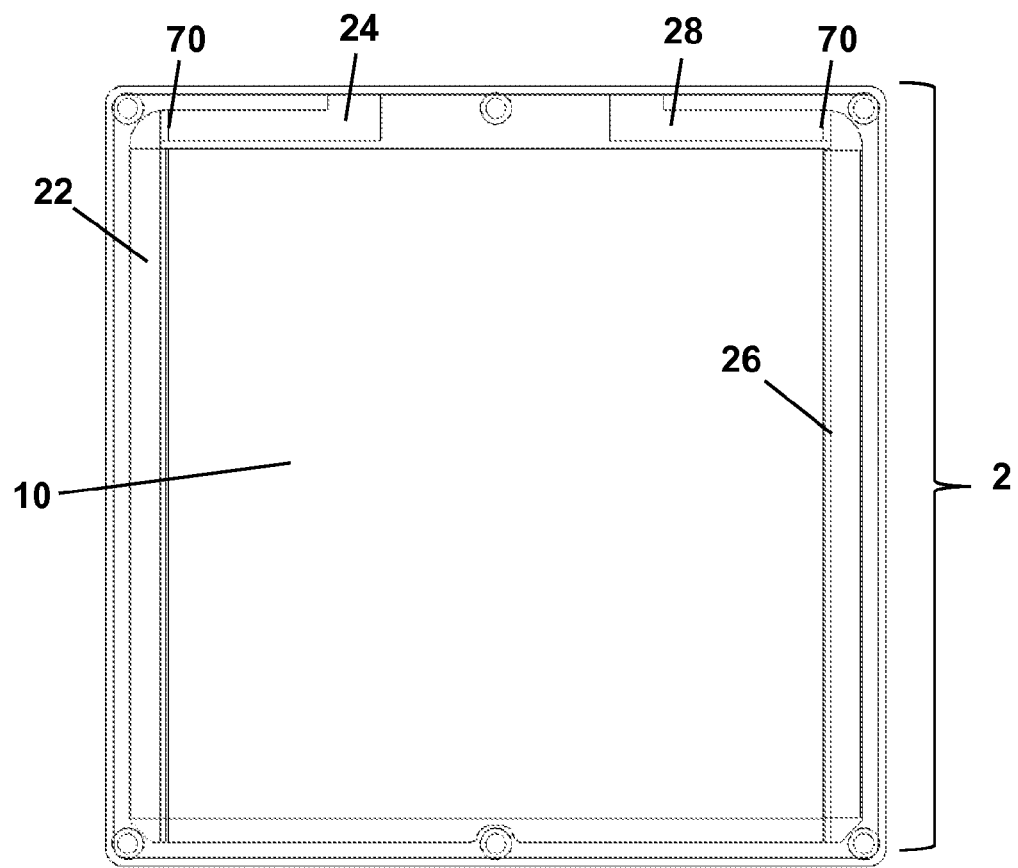
FIG. 5 is a top view of the bottom section of a power wafer enclosure with an energy plate inserted.

FIG. 5 is a top down view of energy plate 10 inserted and resting on ridges 8 (not visible) of bottom section 2 after the initial infusion into void 22 and void 26. Note that interior elevated ridges 70 reduce, if not completely prevent, the initial infusion from entering voids 24 and 28.

Figure 6:
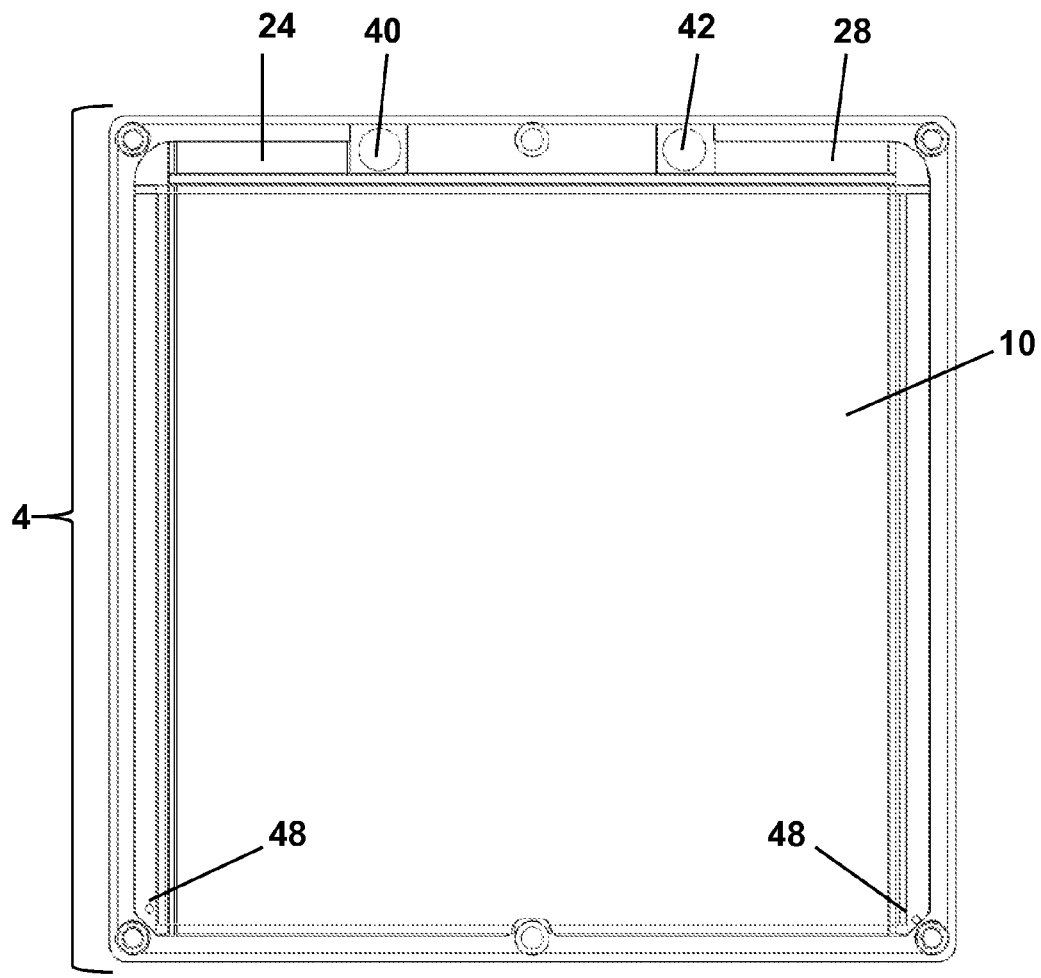
FIG. 6 is top down cutaway view of an assembled power wafer.

FIG. 6 is top down cutaway view of assembled power wafer 1. After the initial infusion shown in FIG. 5, energy plate 10 is placed on ridges 8 (shown in FIG. 1). Then top structure 4, is placed on top of energy plate 10 and connected to bottom structure 2 (not visible) forcing energy plate 10 down and closing off the top and bottom edges of energy plate void 6 (shown in FIG. 1). Secondary infusions are injected into positive terminal 40 and negative terminal 42. These secondary infusions also overlap the initial infusion that was stopped by interior elevated ridges 70 (shown in FIG. 5), thereby promoting current flow. In some embodiments, secondary infusions also allow for the alignment of the carbon nanotubes to direct the electron flow parallel to void 24 and void 28. Air venting holes 48 aid in the free flow of the secondary conductive infusion.

Figure 7:
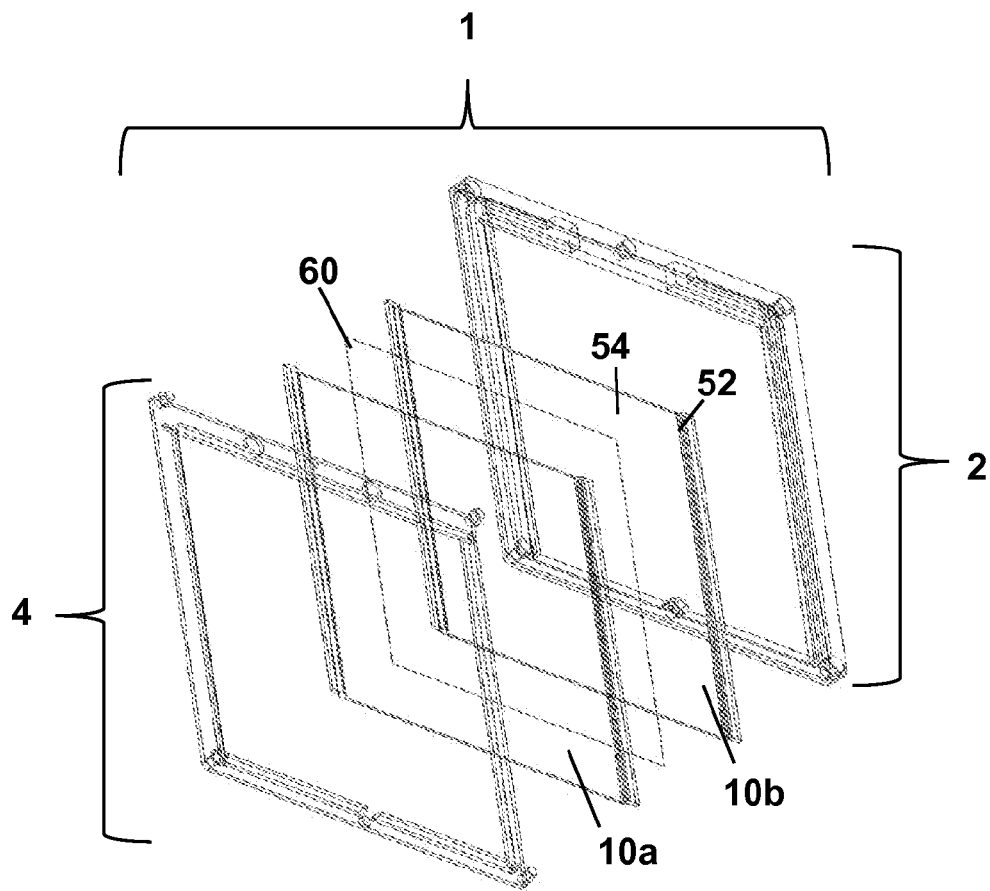
FIG. 7 is an exploded perspective view of a power wafer utilizing multiple energy plates in a parallel configuration.

Turning to FIG. 7, an exploded perspective view of power wafer 1 utilizing multiple energy plates 10a and 10b in parallel configuration is illustrated. Energy plates 10a and 10b are coated on both sides and three edges with cathodic coating 54. Energy plates 10a and 10b also have one uncoated anode edge 52. First energy plate 10a and 10b is configured to rest on the two ridges 8 (not shown) of bottom section 2.

After the initial infusion, first energy plate 10a is placed on ridges 8 (see FIG. 1). Then insulation barrier 60 is placed on top of first energy plate 10a. Next, the second energy plate 10b is placed over insulation barrier 60 in the same alignment as the first energy plate 10a. Then top structure 4, is placed on top of the second energy plate 10b and connected to bottom structure 2 (not visible) forcing energy plates 10a and 10b down and closing off the top and bottom edges of battery void 6 (see FIG. 1). This embodiment increases the amperage within the same form factor of power wafer 1.

Insulator barrier 60 can be made from a variety of materials including, but not limited to: acetate, acrylic, ceramics, MACOR brand machinable glass ceramic, alumina, DELRIN brand acetal resin, epoxy/fiberglass, fluorinated ethylene propylene (FEP), fiberglass laminates, high impact polystyrene, KAPTON brand polyimide film, KAPTREX brand polyimide film, KYNAR brand polyvinylidene fluoride, melamine resin, MELDIN 7001 brand polyimide material, mica, neoprene, NOMEX brand polyaramid material, NORYL brand phenylene oxide resin, nylon (polyamide material), polyether-ether-ketone PEEK), polyethylene terephthalate, phenolics, perfluoroalkoxy (PFA), LEXAN brand polycarbonate material, MAKROLON brand polycarbonate material, MYLAR brand polyester film, polyolefins, polystyrene, polysulfone, silicone foam rubbers, TECHTRON brand polyphenylene sulfide) (PPS) material, ULTEM brand polyetherimide (PEI) material, transformer paper, vulcanized fiber, polyurethane, TEFLON brand polytetrafluoroethylene (PTFE), polyvinyl chloride (PVC), REXOLITE brand cross-linked polystyrene material, RYTON brand polyphenylene sulfide (PPS) material, and VESPEL brand polyimide resin. This material listing can also apply to the power wafer enclosure.

Figure 8:
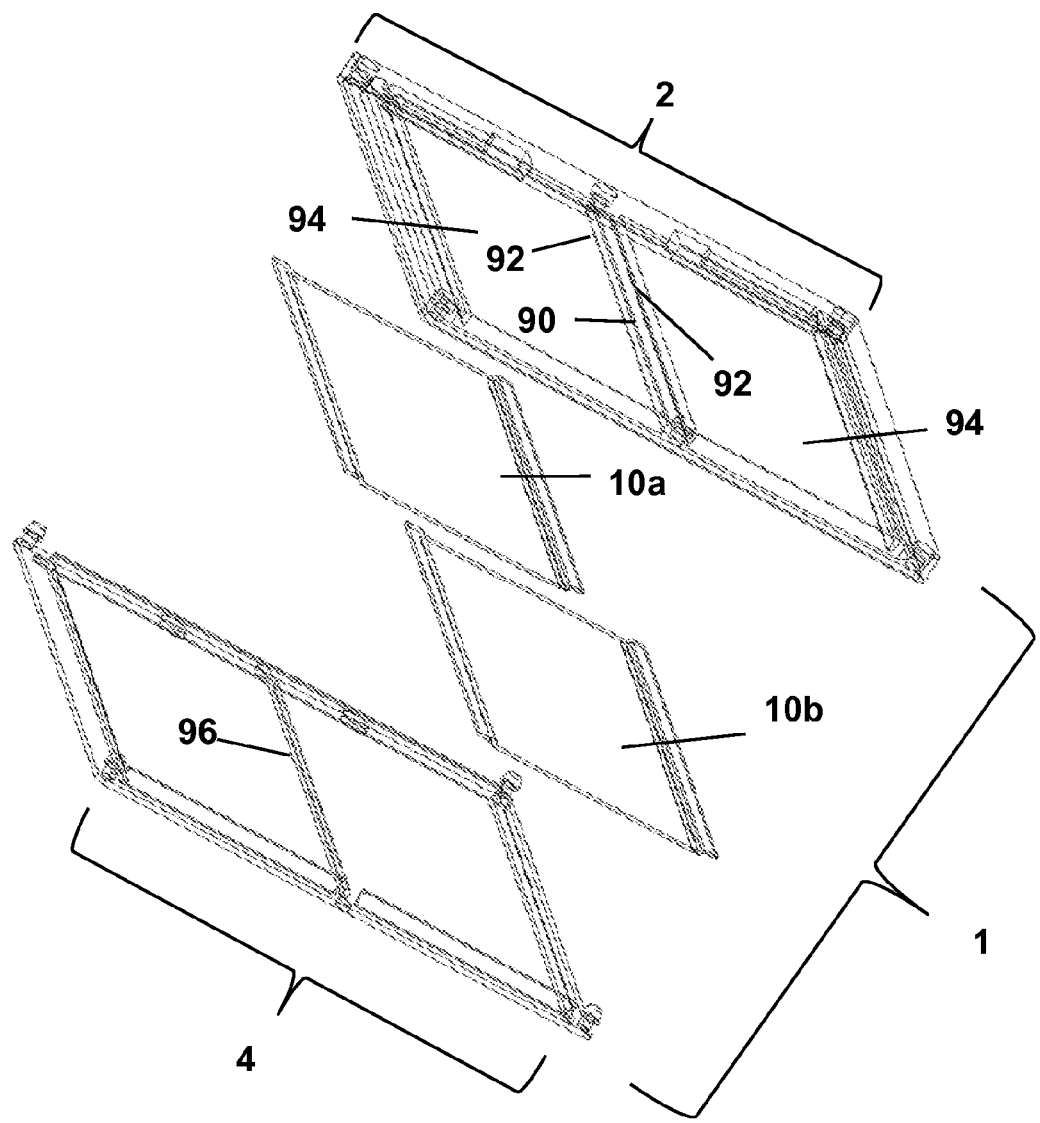
FIG. 8 is an exploded perspective view of a power wafer configured to utilize multiple energy plates in series.

FIG. 8 illustrates an exploded view of power wafer 1 configured to hold two energy plates 10a and 10b in series. In this embodiment, bottom structure 2 contains a central infusion void 90 and two central elevated ridges 92, which separates the two plate compartments 94 from central infusion void 90.

Top structure 4 contains a centered elevated ridge 96 which is configured to push the edges of energy plates 10a and 10b into central infusion void 90.

Figure 9:
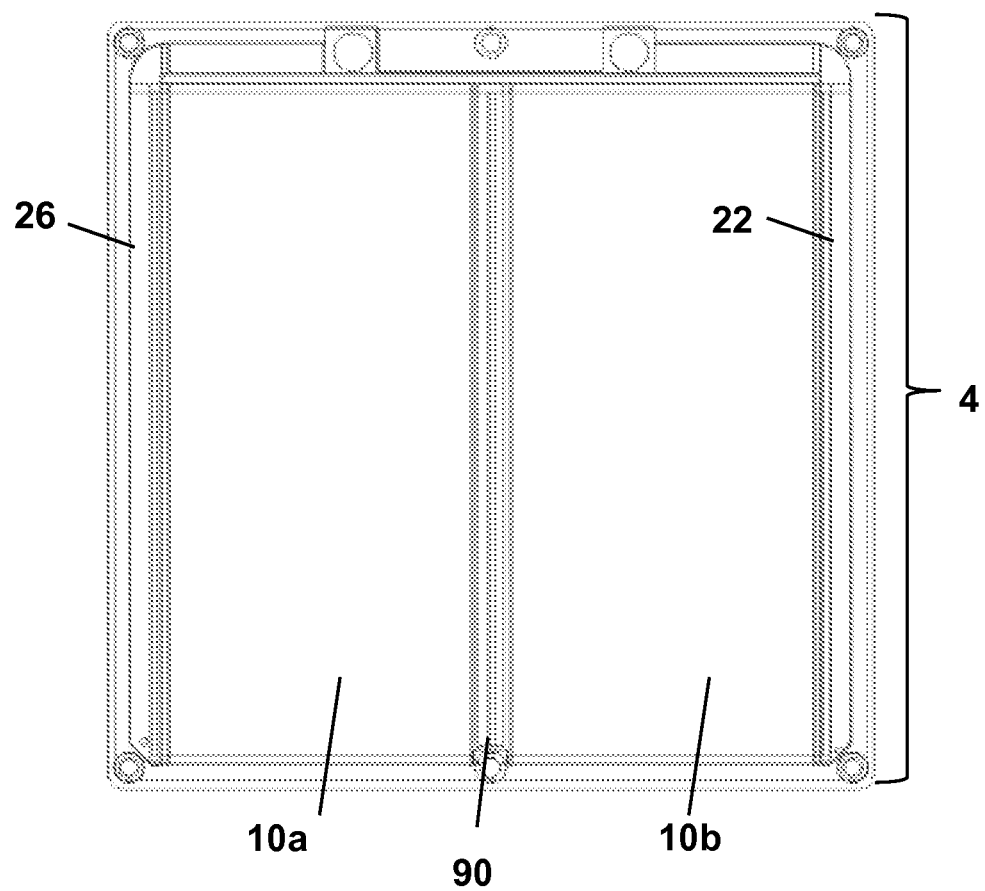
FIG. 9 is a cutaway top view of a power wafer enclosure configured to utilize energy plates in series or in an in-series and in-parallel dual configuration.

Turning to FIG. 9, power wafer 1 with two or more energy plates 10a and 10b, connected in series or in an in in-series and in in-parallel dual configuration, is shown from above. This embodiment increases the voltage within the same form factor of power wafer 1. Top section 4 is configured to snap into bottom section 2 and push the edges of energy plates 10a and 10b into the infusion voids 90, 22 and 26 and seal the assembly.

Figure 10:
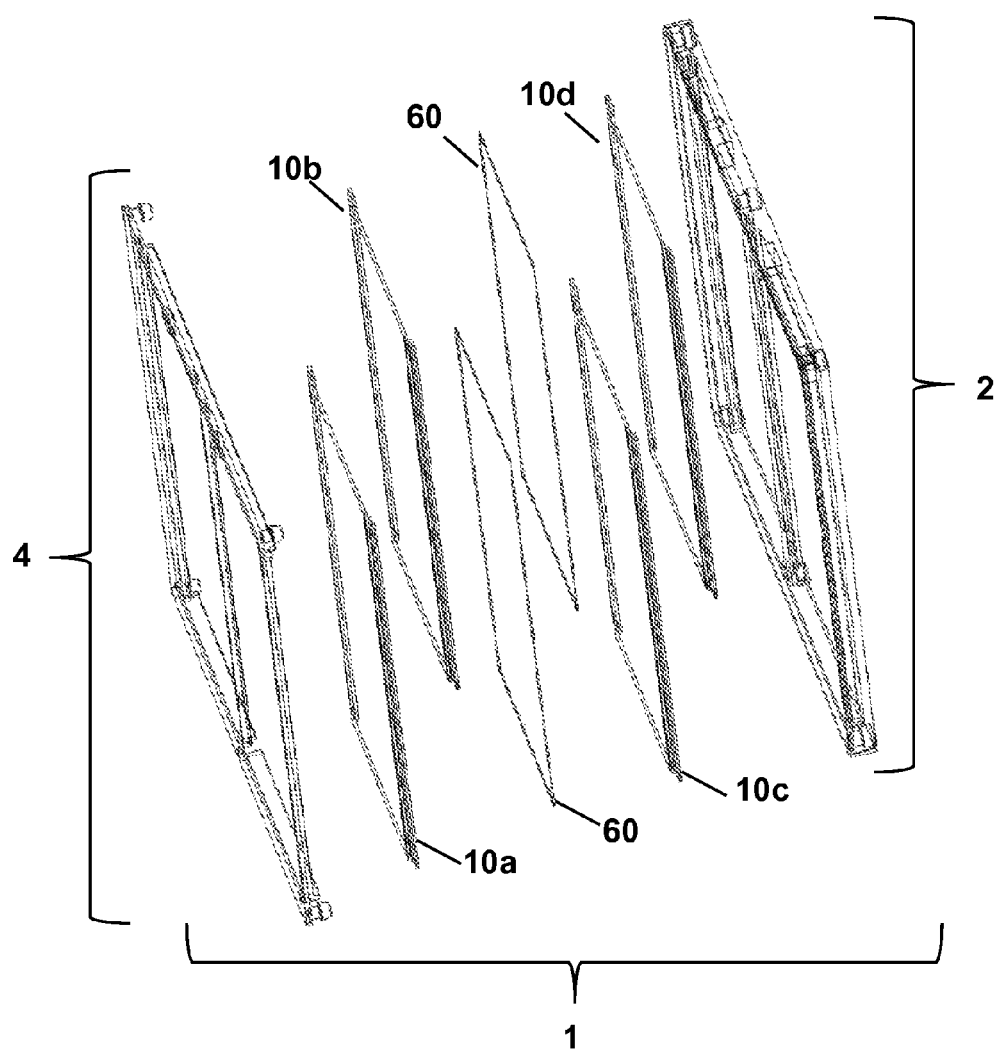
FIG. 10 is an exploded perspective view of a power wafer with multiple plates and insulating dividers in an in-series and an in-parallel dual configuration.

FIG. 10 illustrates an exploded view of power wafer 1 wherein additional energy plates 10a and 10b are placed atop other energy plates 10c and 10d respectfully with an insulating material 60 in between each, to enable an in-series and in in-parallel dual configuration to increase both the voltage and the amperage of the power wafer.

Figure 11:
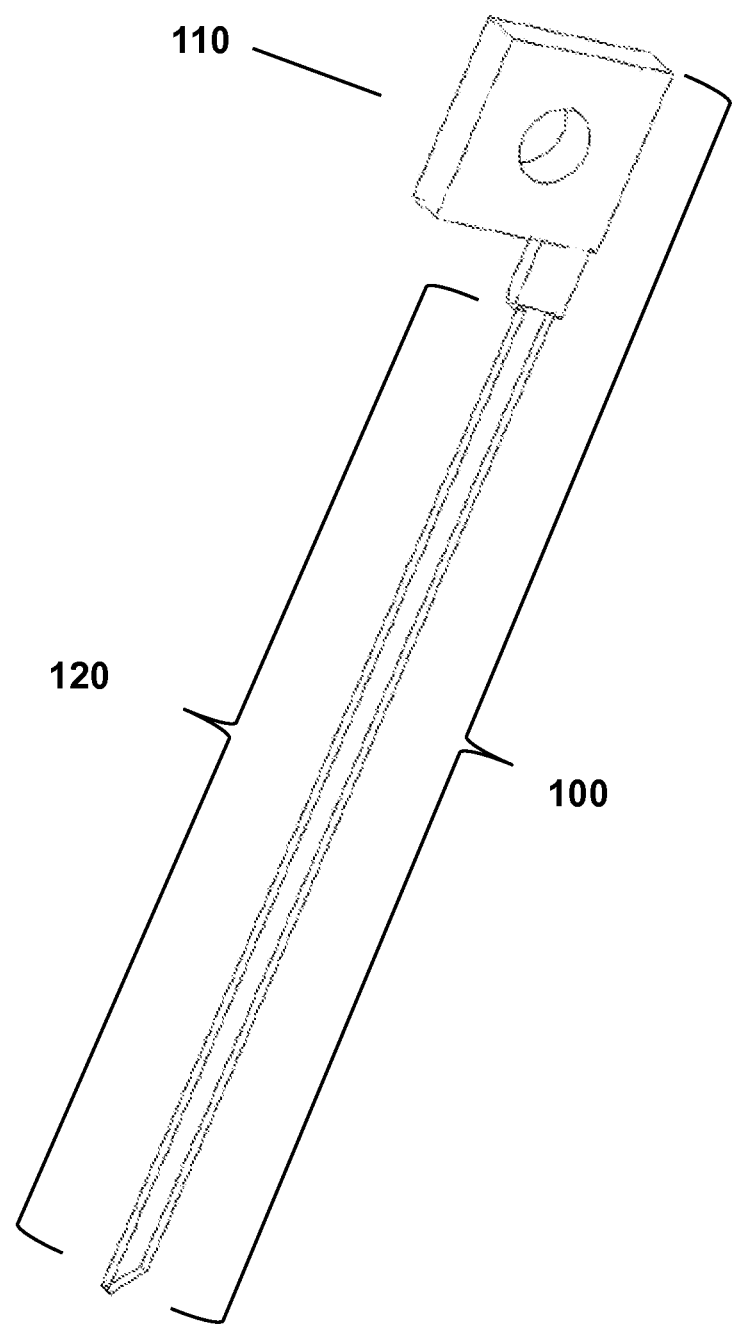
FIG. 11 is a perspective view of a high-current capacity electrical terminal or lug.

Turning to FIG. 11, in some embodiments, high-current capacity electrical terminal 100 can be utilized in power wafer 1. Terminal 100 includes insertion bar section 120 and terminal lug section 110. Terminal 100 can be added to power wafer 1 (see FIG. 12) to enable high amperage charging and discharging currents. Terminal 100 also allows for attachment to an external device via a ring terminal crimped to the end of a heavy gauge insulated wire or cable that is required by the high amperage currents, and the ring terminal is bolted to terminal lug section 110.

Figure 12:
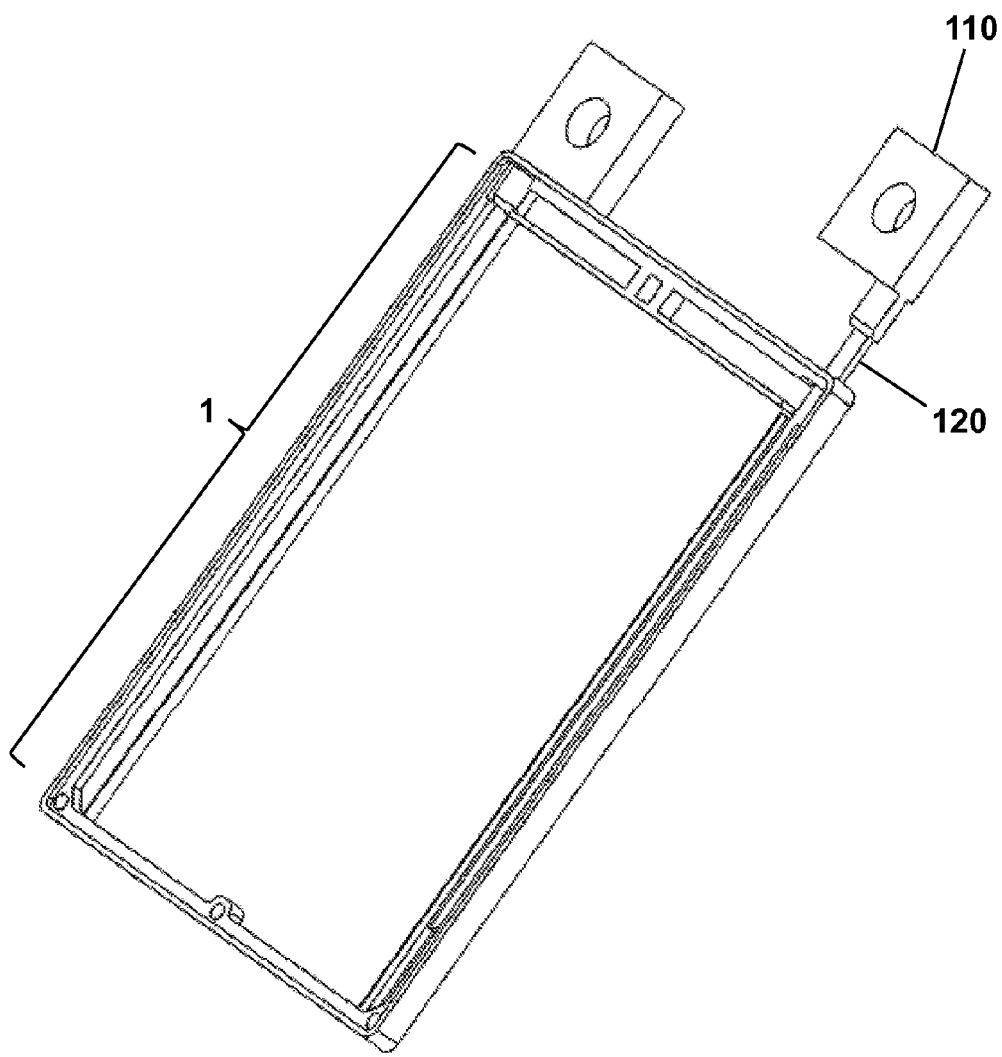
FIG. 12 is a perspective view of a power wafer with one high-current capacity electrical terminals installed and one high-current capacity electrical terminal in the process of being installed into the conductive infusion voids.

FIG. 12 shows a perspective view of one high-current capacity electrical terminal 100 fully inserted into conductive infusion void 22 and a second terminal 100 partially inserted into conductive infusion void 26 of bottom section 2 of power wafer 1.

Figure 13:
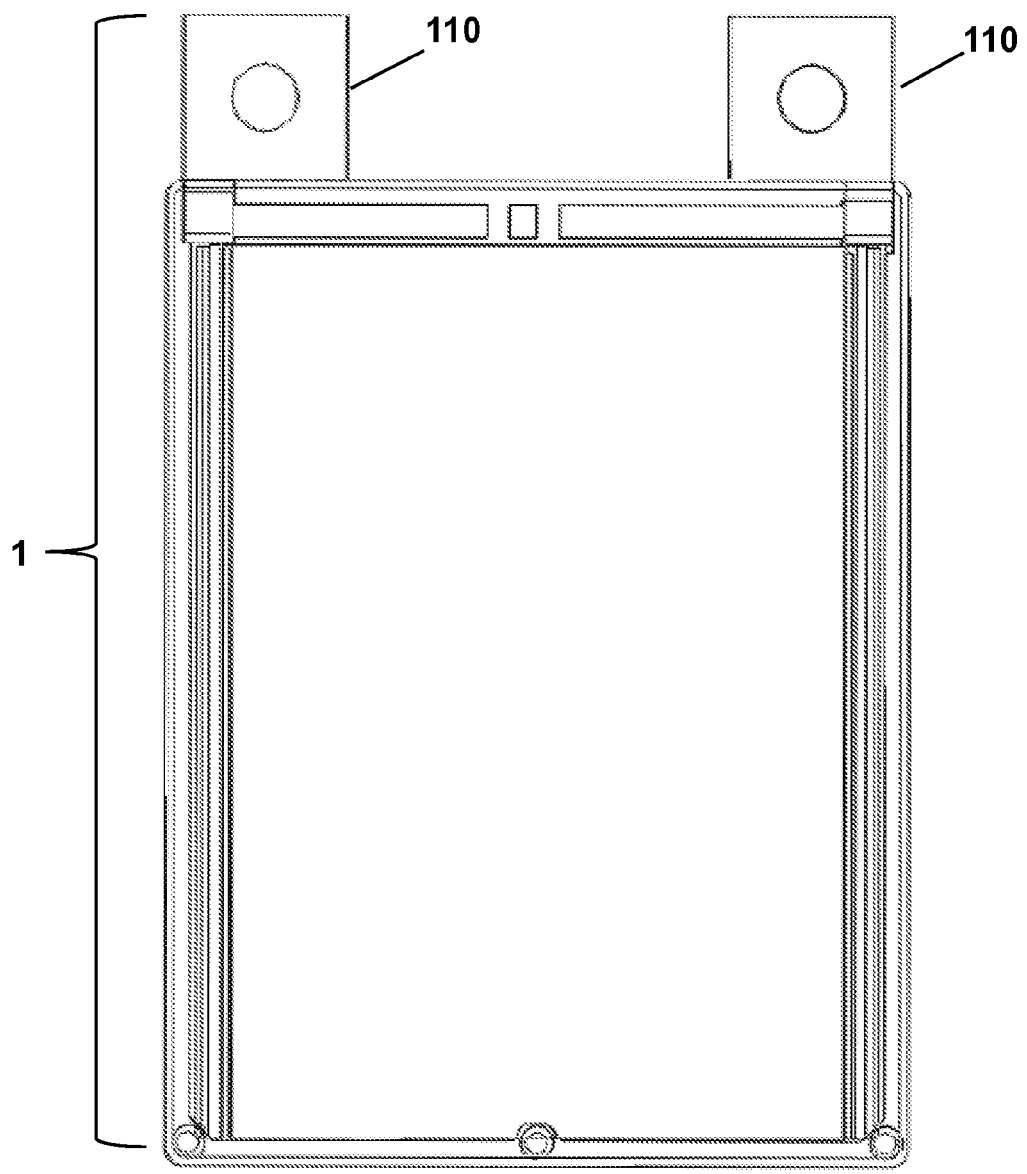
FIG. 13 is a top view of a power wafer with high-current capacity electrical terminals installed in conductive infusion voids and connected to an energy plate via voids filled with a conductive infusion.

FIG. 13 shows a perspective view of bottom section 2 of power wafer 1 with high-current capacity electrical terminals 100 installed in conductive infusion void 22 and 26 and connected to energy plate 10 via voids 22 and 26 filled with a conductive infusion.

Figure 14:
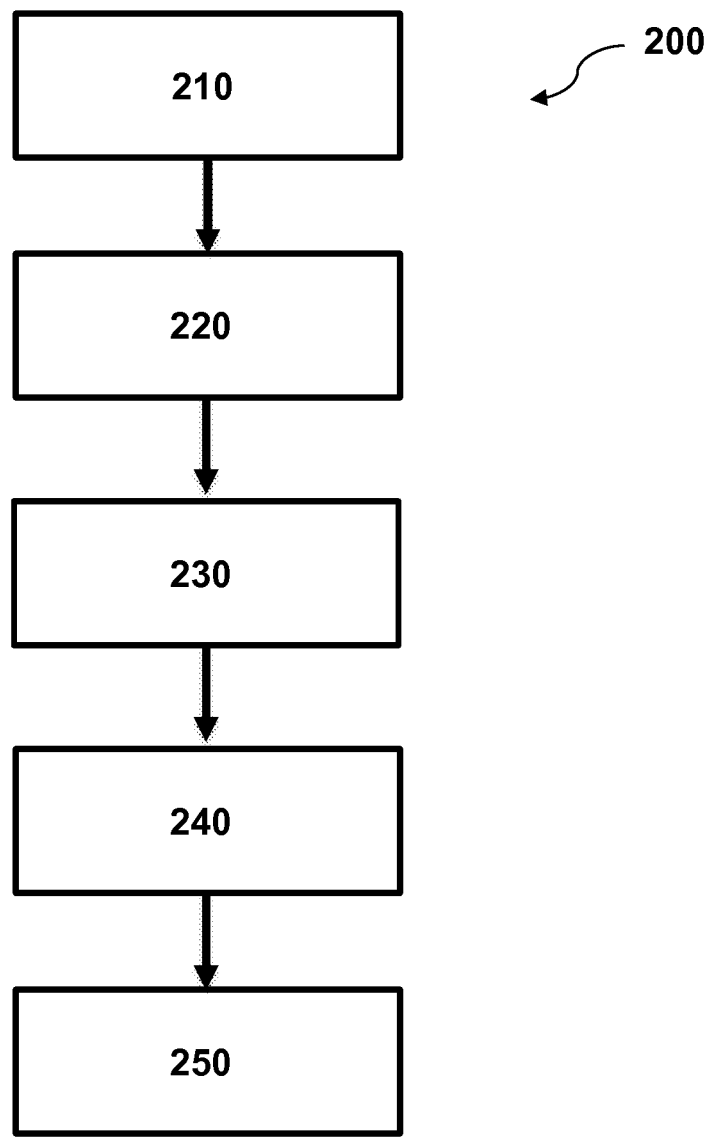
FIG. 14 is a schematic of a method for manufacturing a power wafer.

FIG. 14 illustrates a schematic of method 200 for manufacturing a power wafer such as the power wafer as illustrated in FIG. 3. At block 210, electrical contacts or terminals are installed and a first round of conductive infusions is added (for example, poured and/or injected) into voids in a bottom section of a power wafer enclosure. The conductive infusion fills the voids (for example, two voids) along the sides of the bottom structure and electrically connects elements within each void.

At block 220, an energy plate is placed in contact with the conductive-infusion filled voids. In some embodiments, the energy plate is coated on both sides and three edges with a cathodic coating and a fourth edge is an uncoated anode edge, for example. In some embodiments, multiple energy plates can be inserted in the bottom structure of the power wafer assembly.

In some embodiments, optional alignment at block 230 involves placing the bottom section of the power wafer and the energy plate in a magnetic field before the conductive infusion cures or solidifies. For example, if the conductive infusion contains particles that can be magnetically aligned, aligning the particles in a direction along a center-line axis of the conductive infusion-filled void can increase anisotropic thermal and/or various electrical conductivity of the material. In some embodiments, an electrolyte (for example, a liquid, gel, and/or sponge-like electrolyte material) can be introduced (for example, poured and/or injected) into a center void of the bottom structure of the power wafer assembly to facilitate ion flow between anode and cathode plates.

At block 240, the top section of the power wafer is placed on top of and fastened to the bottom section of the power wafer containing an energy plate. Thus, for example, the energy plate (and, optionally, the electrolyte and/or conductive infusion) are contained between the bottom structure and top structure. The bottom structure and top structure can be connected in a snap-fit assembly and/or other interconnection. A second round of conductive infusions are added via terminals final injection holes in the top section of the power wafer. In some embodiments, further introduction of conductive infusion liquid can also be provided.

In optional alignment at block 250, the power wafer is placed in a magnetic field before the second round of conductive infusions cure or solidify. In some embodiments, the power wafer assembly can be positioned over, under, and/or in a magnetic field to align particles in the second round of conductive infusions according to a second orientation different from a first orientation to which particles in the first round of conductive infusion have been oriented. In some embodiments, the particles are aligned in a direction along the center-line axis of the conduction infusion voids.

In some embodiments, following assembly and alignment of the power wafer structure, the liquid conductive infusion can be solidified. For example, depending upon a type of conductive infusion used in the power wafer assembly, the liquid infusion can be solidifying using one or more of a variety of methods. For example, ultraviolet light curing, heat curing, two-part compound curing and/or evaporative curing, spray-on chemical curing via a catalyst or two-part compound curing (before the top enclosure is positioned) can be employed to solidify the liquid conductive infusion in the power wafer assembly. These and other solidification methods can be applied to the power wafer disclosed herein. The assembled power wafer can be used to form, or otherwise be included in a battery or other energy storage device, such as a capacitor.

While FIG. 14 describes an example method of manufacturing or assembling an example power wafer, many other methods of power wafer assembly/manufacture can alternatively be used. For example, the order of execution of the blocks can be changed, and/or some of the blocks described can be changed, eliminated, or combined. Additionally, the example process of FIG. 14 can be implemented using coded instructions (for example, computer and/or machine readable instructions) stored on a computer readable storage medium.

While particular elements, embodiments and applications of the present invention have been shown and described, it will be understood, that the invention is not limited thereto since modifications can be made by those skilled in the art without departing from the scope of the present disclosure, particularly in light of the foregoing teachings.

What is claimed is:

1. A power wafer comprising:
   (a) a bottom enclosure section;
   (b) a top enclosure section;
   (c) a first energy plate interposed between said bottom enclosure section and said top enclosure section; and
   (d) at least one conductive infusion, wherein said at least one conductive infusion comprises magnetically aligned carbon nanoparticles.

2. The power wafer of claim 1, wherein said carbon nanoparticles are carbon nanotubes.

3. The power wafer of claim 1, wherein said carbon nanoparticles are graphene.

4. The power wafer of claim 1, wherein said first energy plate comprises an anode and a cathode, and said at least one conductive infusion comprises a first conductive infusion electrically connected to said anode and a second conductive infusion electrically connected to said cathode.

5. The power wafer of claim 1, wherein said bottom enclosure section comprises:
   (i) a first energy plate void configured to receive said energy plate;
   (ii) a pair of ridges configured to hold said first energy plate;
   (iii) a first conductive infusion void;
   (iv) a second conductive infusion void, wherein said first conductive infusion void and said second conductive infusion void are partially separated by a first dam;
   (v) a third conductive infusion void; and
   (vi) a fourth conductive infusion void, wherein said third conductive infusion void and said fourth conductive infusion void are partially separated by a second dam.

6. The power wafer of claim 1, further comprising:
   (e) an electrical terminal sized according to the current-carrying capacity of said first energy plate.

7. The power wafer of claim 1, wherein said first energy plate is a battery.

8. The power wafer of claim 1, wherein said first energy plate is a capacitor.

9. A power wafer comprising:
   (a) a bottom enclosure section comprising a central conductive infusion void;
   (b) a top enclosure section;
   (c) a first energy plate interposed between said bottom enclosure section and said top enclosure section;
   (d) at least one conductive infusion; and
   (e) a second energy plate.

10. The power wafer of claim 9 wherein said at least one conductive infusion comprises conductive particles.

11. The power wafer of claim 10 wherein said conductive particles are carbon nanoparticles.

12. The power wafer of claim 9, wherein said first energy plate comprises an anode and a cathode, and said at least one conductive infusion comprises a first conductive infusion electrically connected to said anode and a second conductive infusion electrically connected to said cathode.

13. The power wafer of claim 9, wherein said first energy plate is a battery.

14. The power wafer of claim 9, wherein said first energy plate is a capacitor.

15. The power wafer of claim 9, further comprising:
    (f) a first insulating barrier disposed between said first energy plate and a second energy plate.

16. A power wafer comprising:
    (a) a bottom enclosure section;
    (b) a top enclosure section;
    (c) a first energy plate interposed between said bottom enclosure section and said top enclosure section, wherein said first energy plate is coated on both sides and three edges with a first electrode coating, wherein a fourth edge has a second electrode coating disposed on a fourth edge of said first energy plate, and wherein said first electrode coating and said second electrode coating are different materials; and
    (d) at least one conductive infusion.

17. The power wafer of claim 16 wherein said at least one conductive infusion comprises conductive particles.

18. The power wafer of claim 16, wherein said first energy plate comprises an anode and a cathode, and said at least one conductive infusion comprises a first conductive infusion electrically connected to said anode and a second conductive infusion electrically connected to said cathode.

19. The power wafer of claim 16, wherein said first energy plate is a battery.

20. The power wafer of claim 16, wherein said first energy plate is a capacitor.

* * * * *